April 29, 1941.  G. A. JOHNSON  2,240,216
COUCH BED
Filed June 13, 1938  2 Sheets-Sheet 1

Inventor
Gustave A. Johnson
by Roberts, Cushman & Woodbury
attys.

April 29, 1941.  G. A. JOHNSON  2,240,216
COUCH BED
Filed June 13, 1938  2 Sheets-Sheet 2

Inventor
Gustave A. Johnson
By Roberts, Cushman & Woodberry
Att'ys.

Patented Apr. 29, 1941

2,240,216

UNITED STATES PATENT OFFICE 2,240,216

COUCH BED

Gustave A. Johnson, Weymouth, Mass., assignor to New England Bedding Company, Medford, Mass., a corporation of Massachusetts Application June 13, 1938, Serial No. 213,387

2 Claims. (Cl. 5—18)

This invention relates to couch beds of the extensible type, and its principal objects are to provide a couch bed having relatively movable, nestable sections which may be automatically moved to an extended position and which is provided with a reliable and efficient operating mechanism designed so that the extended section may be easily moved back to nested position; and to provide a couch bed which is of strong and durable construction and of attractive appearance and which is so designed that the operating mechanism is substantially concealed.

Further objects relate to various features of construction and will be apparent from a consideration of the following description and accompanying drawings, wherein.

In accordance with the present invention, I provide a pair of nestable sections relatively movable from a nested relation, wherein the outer section provides a couch or single bed, to an extended position, wherein the two sections cooperate to form a bed of superior size, the movement of the sections from nested to extended position being accomplished automatically by the release of a catch or the operation of a conveniently located pedal. The actuating mechanism preferably comprises a pair of equalizing links associated with one or more springs which are effective upon the release of the catch or operation of the pedal to urge the movable section outwardly to extended position, and there is also provided one or more springs or the like retracting means which are effective, when the movable section approaches its extended position, not only to counteract the force exerted by the actuating spring and thus prevent excessive speed of movement of the movable section as it approaches extended position and consequent shock, but also to store up energy which acts on the movable section, tending to urge it toward nested position, thus materially assisting in manually moving the movable section from extended to nested position.

Where, as is preferred, the actuating and retracting means comprise helical springs, the construction and arrangement is such that when the sections are in nested relation the force exerted by the actuating spring is sufficiently greater than that exerted by the retracting spring to effect outward movement of the movable section, and when the sections are in extended position, the force exerted by the retracting spring is preferably sufficient at least to counterbalance that exerted by the actuating spring, but insufficient by itself to effect inward movement of the movable section. With this construction and arrangement the force required to initiate inward movement of the movable section is reduced to a minimum, and as once inward movement has been initiated it is comparatively easy to continue such movement even though opposed by the actuating spring.

Figure 1:
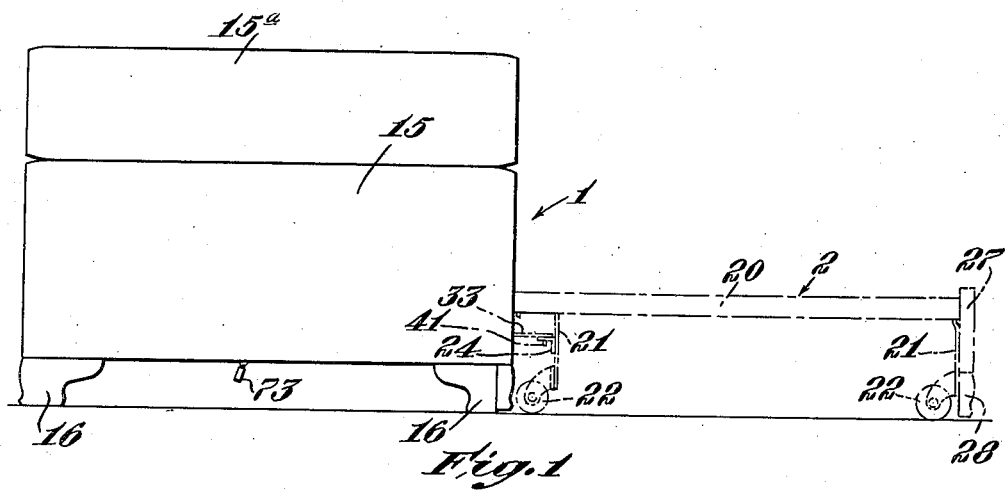
Fig. 1 is an end elevation of a couch bed constructed in accordance with the present invention.
Figure 2:
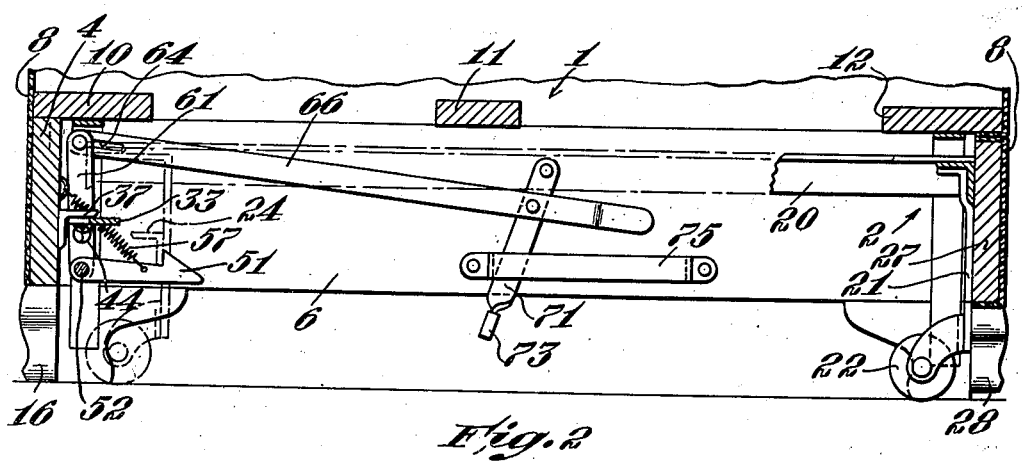
Fig. 2 is an enlarged fragmentary transverse vertical section taken on a plane parallel to the view of Fig. 1.
Figure 3:
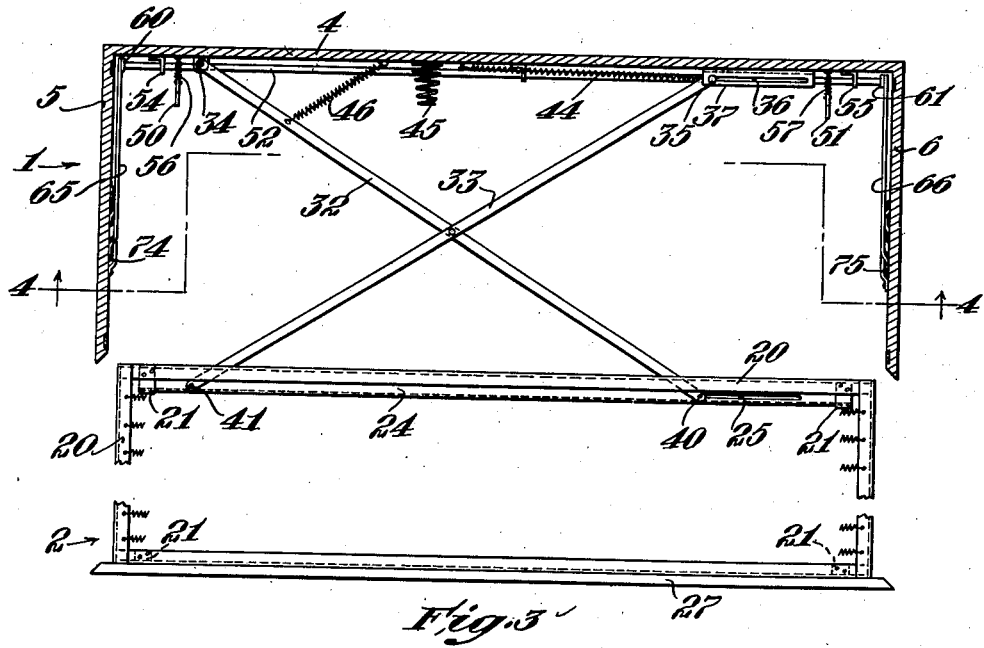
Fig. 3 is a horizontal section showing the parts in extended position.

The embodiment chosen for illustration comprises a pair of nestable sections, designated generally by the numerals 1 and 2, the main or outer section 1 being stationary and the inner section 2 being movable from nested relation, as shown by the full lines in Fig. 1, to an extended position shown in Fig. 3 and by the dot and dash lines of Fig. 1. The outer section 1 comprises a rear wall 4 and side or end walls 5 and 6 rigidly secured to each other in any suitable manner to provide a box-like housing which may be provided with any suitable finish, such as a decorative fabric 8 (Fig. 2). A plurality of slats 10, 11 and 12 (Fig. 2) extend longitudinally across the top and provide a mattress-supporting structure.

The front end of the section is formed with an elongate opening defined by the front edges of side walls 5 and 6 and the slat 12. The lower or fixed mattress 15 (Figs. 1 and 4) is suitably secured to the mattress-supporting structure and the fabric 8 extends about the mattress to provide, in effect, an envelope about the entire section, as shown in Figs. 1 and 2. At each corner the section 1 is provided with legs 16 which support the entire structure in spaced relation to the floor.

The inner or movable section 2 comprises a rectangular mattress-supporting frame 20 (Fig. 3), which may be of conventional construction and supported adjacent to each corner by legs or uprights 21, each of which is provided with a caster or roller 22, the parts being so constructed and arranged that the frame 20 is supported at a level slightly below the slats 10, 11 and 12 (Figs. 2 and 4), so that the section 2 may be moved to and from nested position with adequate clearance. The rear of the section 2 is provided with a longitudinally extending rail or bar 24 which is rigidly secured to the rear legs 21, as shown by the dot and dash lines of Figs. 1 and 2, and adjacent to one end the bar 24 is formed with an elongate slot 25 (Fig. 3).

Figure 5:
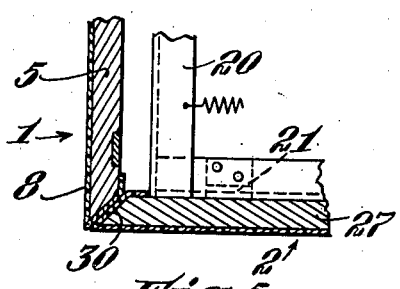
Fig. 5 is an enlarged section showing the construction of the outer corners of the couch bed.

The section 2 is also provided with a front wall member 27 (Figs. 1, 2 and 5) which is suitably secured to the frame 20 and front legs 21, the size and shape of the wall 27 being such as to provide a closure for the opening in the front of the stationary section 1 when the two sections are in nested relation. In order to enhance the appearance of the structure, "dummy legs" 28 (Figs. 1 and 2) may be secured to the lower ends of the wall 27, and the outer face of wall 27 may be provided with a suitable finish, such as decorative fabric 8. In order to insure proper fitting of the front wall 27 relative to the side walls 5 and 6 and thus present an appearance of continuity with these walls when the sections are in nested relation, the vertical ends of the walls 5, 6 and 27 are beveled or shaped to define cam-like surfaces 39 (Fig. 5) which cooperate with each other when the inner section approaches nested position to effect whatever lateral movement of the inner section that may be necessary properly to position the wall 27 relative to the walls 5 and 6. With this construction and arrangement, the inner section cannot be moved to a fully nested position without first bringing the cam-like surface 39 into cooperative relation, and hence when the sections are in fully nested position a proper fit of the front wall, as shown in Fig. 5, is assured. Where means are provided for holding the sections in nested relation, as hereinafter described, the structure may be used or moved about without danger of causing a gap to be formed between the adjacent ends of the front and side walls.

Figure 4:
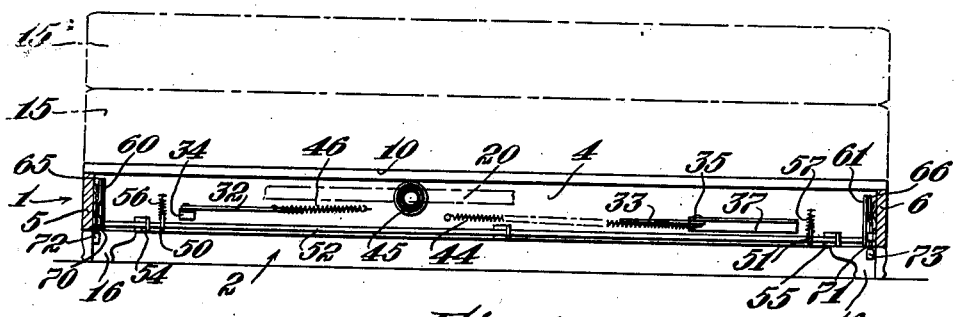
Fig. 4 is a section on the line 4—4 of Fig. 3.

In order to insure a smooth even movement of the inner section to and from extended position, I provide a pair of equalizing links 32 and 33, the inner end of the link 32 being pivoted to a bracket 34 which is secured to the inner face of the rear wall 4, and the corresponding end of the link 33 being provided with a pin 35 which rides in an elongate slot 36 formed in a bracket 37 which is secured to the rear wall 4, as shown in Figs. 3 and 4. The outer end of link 32 carries a pin 40 which rides in the slot 25 (Fig. 3) and the outer end of link 33 carries a pivot pin 41 which is received in an aperture in the bar 24, the arrangement being such that the outer ends of links 32 and 33 may be raised so as to remove the pins 40 and 41 from the slot 25 and the aperture in the bar 24, thus permitting the sections 1 and 2 to be disconnected so as to provide twin beds.

The actuating mechanism for moving the inner section from nested to extended position is associated with the equalizing links and comprises a main or actuating spring 44 (Figs. 2 to 4), one end of which is secured to the pin 35 and its other end is secured in any suitable manner to the inner face of the rear wall 4. The construction and arrangement of the equalizing links 32, 33 and the actuating spring 44 is such that when the sections are in nested relation the pin 35 is at or adjacent to the outer (right-hand) end of the slot 36, in which position the spring 44 is under sufficient tension to effect outward movement of the inner section, at least after such movement has been initiated in the manner hereinafter described. To provide for such initial outward movement and to prevent shock due to the use of excessive force when pushing the inner section to nested position, a spiral spring 45 (Figs. 3 and 4) is secured to the inner face of the wall 4 at a level to engage the rear edge of the frame 20 when the inner section is in nested position, the spring 45 when thus positioned being effective to give the inner section a slight outward push or starting movement which is continued by the force of the spring 44 acting on the link 33.

In order to prevent the actuating spring 44 from moving the inner section outwardly at an excessive speed and to eliminate the consequent shock and also to minimize the force required to initiate inward movement of the inner section, I provide a helical spring 46 (Fig. 3), one end of which is secured to the link 32 and the other end of which is secured to the inner face of the wall 4. The arrangement is such that when the sections are in or near fully nested relation, the spring 46 exerts little or no force counteracting that exerted by the spring 44, but when the sections are in extended position, the spring 46 is subjected to sufficient tension substantially to counterbalance the action of the spring 44. With this construction and arrangement the action of the spring 44 on the inner section during the first part of its outward movement is substantially unopposed, but thereafter the spring 46 comes into action, offering progressively increasing opposition to the action of the spring 44, until the inner section is in fully extended position, at which time the opposing force of the spring 46 is sufficient substantially to counterbalance the action of the spring 44. During the outward movement of the inner section a part of the energy stored in the spring 44 is utilized in moving the inner section and another part is utilized in overcoming the opposition of the spring 46, substantially all of which is stored up by the spring 46, where it is later available for use in minimizing the force required to initiate inward movement of the inner section 2. During such inward movement the action is reversed and as the inner section approaches fully nested position, its rear edge engages the spring 45, thereby compressing it and storing up sufficient energy to effect an initial outward movement upon the operation of a latch mechanism, presently to be described.

The latch mechanism comprises a pair of spaced catches 50 and 51 (Figs. 2 to 4) fixed to a shaft 52 which extends along the lower part of the rear wall 4, the shaft 52 being rotatably mounted in bearings or openings formed in brackets 54 and 55. The catches 50 and 51 are provided with tension springs 56 and 57 which normally hold them in a substantially horizontal position, wherein their outer ends or noses are engageable with the vertical wing of bar 24 so as to hold the inner section in nested position, as shown in Fig. 2. In order to release the catches the shaft 52 is rotated so as to swing the catches downwardly, such rotation being accomplished by an arrangement comprising arms 60 and 61 (Figs. 2 to 4) fixed to the ends of the shaft 52. The free ends of the arms have pin and slot connections, indicated at 64 (Fig. 2), with links 65 and 66 which are pivotally connected adjacent to their opposite ends to actuating levers 70 and 71 which are pivotally secured to the walls 5 and 6, respectively. The inner ends of the links 65 and 66 are bent inwardly against the inner surfaces of the end walls 5 and 6 to provide a friction brake which eliminates a free or unrestrained movement of the links and associated parts. The lower ends of the levers 70 and 71 are bent at right angles to provide pedals 72 and 73 which extend downwardly below the lower edges of side walls 5 and 6 so that they may be conveniently manipulated. In order to prevent the levers 70 and 71 from being accidentally bent inwardly, guide bars 74 and 75, secured to the walls 5 and 6, may be provided, as shown in Fig. 2.

In operating the structure herein shown (assuming the parts to be in nested position as shown in Fig. 2), it is merely necessary to swing or kick either lever 70 or 71 forwardly (to the right in Fig. 2), such movement being effective to rotate the shaft 52 and swing both catches downwardly clear of the bar 24, whereupon spring 45 becomes effective to initiate an outward movement of the inner section, which movement is continued by the action of spring 44 until fully extended position has been reached, at which point the inner section is brought to rest. When the inner section is in extended position, the upper mattress 15a (Figs. 1 and 4) may be rolled or slid onto the section 2 to provide a double bed, and if desired the links 32 and 33 may be disengaged, as above described, so that the two sections may be separated to form twin beds.

The inner section may be moved to nested position by a slight inward push, as above described, and just prior to reaching its fully nested position the bar 24 is brought into engagement with the catches 50 and 51, causing them to swing downwardly and when in fully nested position the catches are then swung back to locking position by the action of springs 56 and 57, as shown in Fig. 2. Due to the pin and slot connections 64, the latch-engaging movement of the shaft 52 is not transmitted to either lever 70 or 71, and for the same reason the operation of one of these levers does not effect a corresponding movement of the other, thus eliminating unnecessary movement of parts and insuring a smooth and easy operation.

It will be noted that due to the action of the cam-like surfaces 30 the ends of the front wall closely fit against the adjacent ends of the side walls when the sections are in nested relation, and as this close-fitting relationship is necessarily maintained by the catches 50 and 51, there is no danger of a gap developing between the adjacent end of these walls, and hence the general appearance of the structure is greatly improved.

While I have shown and described one desirable embodiment of the invention, it is to be understood that this disclosure is for the purpose of illustration and that various changes in shape, proportion and arrangement of parts, as well as the substitution of equivalent elements for those herein shown and described, may be made without departing from the spirit and scope of the invention as set forth in the appended claims.

I claim:

1. A couch bed comprising a pair of nestable bed sections relatively movable rectilinearly from nested position to extended position, a pair of equalizing links pivotally interconnected between their ends, the opposite ends of said links being connected with said sections so that said links are operative to guide the movable section rectilinearly to and from extended position, an actuating spring having one end connected with one of said links and its opposite end connected to one of said sections in such a manner as to move the movable section from nested to extended position when outward movement has been initiated, said actuating spring being normally ineffective when said sections are in nested position due to the angle at which said spring acts on the link, a releasable catch for holding the movable section in nested position, means effective upon the release of said catch to initiate outward movement of said movable section thereby to permit said actuating spring to be brought into action, and a retracting spring connected at one end with one of said sections and at its opposite end to one of said links for counteracting the operation of said actuating spring only when said movable section approaches extended position, the counteracting spring being held under substantial tension by the sections when in extended position and tending to urge said movable section inwardly, but being ineffective completely to overcome the resistance to inward movement offered by the extended movable section and said actuating spring.

2. A couch bed comprising a stationary outer section, a movable inner section nestable within said outer section, equalizing links pivotally interconnected with each other between their ends and connected to said sections so as to guide the inner section rectilinearly to and from nested position, an actuating spring connected at one end with the stationary section and at its opposite end to the end of one of said links and operative to move the inner section from nested to extended position when outward movement has been initiated, but normally ineffective when said sections are in nested position due to the angle at which said spring acts on the link, a releasable catch for holding said inner section in nested position, means effective upon the release of said catch to initiate outward movement of said inner section thereby to permit said actuating spring to be brought into action, and a retracting spring connected at one end with the other of said links and at its opposite end with said outer section for counteracting the operation of said actuating spring only when said inner section approaches extended position, said counteracting spring being held under substantial tension by the sections when in extended position and tending to urge the inner section inwardly, but being ineffective completely to overcome the resistance to inward movement offered by the extended inner section and said actuating spring.

GUSTAVE A. JOHNSON.